(12) United States Patent
Yoo et al.

(10) Patent No.: US 9,733,531 B2
(45) Date of Patent: Aug. 15, 2017

(54) LIQUID CRYSTAL DISPLAY

(71) Applicant: Samsung Display Co., Ltd., Yongin, Gyeonggi-Do (KR)

(72) Inventors: Dong-Hyun Yoo, Hwaseong-si (KR); Hyung Jun Park, Seongnam-si (KR); Seong Young Lee, Hwaseong-si (KR); Bo Yeong Kim, Asan-si (KR)

(73) Assignee: Samsung Display Co., Ltd., Samsung-ro, Giheung-Gu. Yongin-si, Gyeonggi-Do (KR)

( * ) Notice: Subject to any disclaimer, the term of this patent is extended or adjusted under 35 U.S.C. 154(b) by 2 days.

(21) Appl. No.: 15/001,899

(22) Filed: Jan. 20, 2016

(65) Prior Publication Data
US 2016/0216577 A1    Jul. 28, 2016

(30) Foreign Application Priority Data

Jan. 26, 2015    (KR) .................. 10-2015-0012372

(51) Int. Cl.
| | | |
|---|---|---|
| *G02F 1/1368* | (2006.01) | |
| *G02F 1/1343* | (2006.01) | |
| *G02F 1/1337* | (2006.01) | |
| *G02F 1/139* | (2006.01) | |

(52) U.S. Cl.
CPC .. *G02F 1/134309* (2013.01); *G02F 1/133707* (2013.01); *G02F 1/1393* (2013.01); *G02F 2001/134345* (2013.01)

(58) Field of Classification Search
CPC ......... G02F 1/133707; G02F 1/134309; G02F 1/136; G02F 1/1368; G02F 1/133345; G02F 1/133753; G02F 1/136286; G02F 1/134336; G02F 1/1362; G02F 1/136227; G02F 1/133512; G02F 1/13624; G02F 1/133514; G02F 1/1343; G02F 1/1333; G02F 2001/134318; G02F 2001/134345; G02F 2001/133757; G02F 2001/133357; G02F 2201/123; G02F 2201/40; G09G 2300/0426; G09G 2300/0465; G09G 3/3648; G09G 3/3688; H01L 51/5203;
(Continued)

(56) References Cited

U.S. PATENT DOCUMENTS

| | | | |
|---|---|---|---|
| 8,696,950 | B2 | 4/2014 | Suwa et al. |
| 8,947,624 | B2 | 2/2015 | Murata et al. |
| 2011/0075085 | A1 | 3/2011 | Park |

(Continued)

FOREIGN PATENT DOCUMENTS

| | | |
|---|---|---|
| KR | 10-0607741 B1 | 8/2006 |
| KR | 10-2011-0029890 A | 3/2011 |

*Primary Examiner* — Thoi Duong
(74) *Attorney, Agent, or Firm* — Robert E. Bushnell, Esq.

(57) ABSTRACT

A liquid crystal display includes: a first substrate; a first electrode formed on the first substrate; a second substrate configured so as to face the first substrate; and a second electrode formed on the second substrate. The first electrode includes a first portion having a plate shape and a plurality of branch electrodes extending from the first portion. The second electrode includes a cross-shaped cutout including a horizontal stem and a vertical stem which cross each other at a center thereof. A width of the first electrode and a distance between two adjacent ones of the branch electrodes are varied according to position.

10 Claims, 10 Drawing Sheets

(58) Field of Classification Search
CPC ............. H01L 51/5212; H01L 27/3262; H01L 29/41733; H01L 29/786
USPC ... 349/139, 43, 138, 144, 143, 42, 110, 129, 349/141
See application file for complete search history.

(56) References Cited

U.S. PATENT DOCUMENTS

| | | | |
|---|---|---|---|
| 2013/0101755 A1* | 4/2013 | Lee | G02F 1/133707 428/1.23 |
| 2013/0128208 A1 | 5/2013 | Yao et al. | |
| 2014/0009719 A1* | 1/2014 | Xu | G02F 1/134309 349/61 |
| 2014/0152934 A1 | 6/2014 | Huh et al. | |
| 2014/0168588 A1 | 6/2014 | Suwa et al. | |
| 2015/0085233 A1 | 3/2015 | Kim et al. | |
| 2015/0109570 A1 | 4/2015 | Yim et al. | |
| 2015/0313447 A1 | 11/2015 | Arai | |
| 2016/0195781 A1* | 7/2016 | Lee | G02F 1/134309 349/138 |

\* cited by examiner

LIQUID CRYSTAL DISPLAY

CLAIM OF PRIORITY

This application claims priority to and the benefit of Korean Patent Application No. 10-2015-0012372 filed in the Korean Intellectual Property Office on Jan. 26, 2015, the entire contents of which are incorporated herein by reference.

BACKGROUND OF THE INVENTION

Field of the Invention

The present invention relates to a liquid crystal display, and more particularly, a liquid crystal display which prevents irregular movement and slow response speed of liquid crystal molecules while increasing transmittance of the liquid crystal display.

Description of the Related Art

A liquid crystal display, which is one of the most common types of flat panel displays currently in use, includes two sheets of display panels with field generating electrodes such as a pixel electrode, a common electrode, and the like, and a liquid crystal layer interposed therebetween. In the liquid crystal layer, voltages are applied to the field generating electrodes to generate an electric field in the liquid crystal layer. Then, the alignment of liquid crystal molecules of the liquid crystal layer is determined by the electric field so as to control the polarization of incident light, thereby displaying images.

Among the liquid crystal displays, a vertically aligned (VA) mode liquid crystal display in which long axes of the liquid crystal molecules are arranged so as to be perpendicular to upper and lower display panels while electric fields are not applied is in the spotlight because its contrast ratio is high and it is easy to implement a wide standard viewing angle.

In order to implement a wide viewing angle in such a vertically aligned mode liquid crystal display, a plurality of domains having different alignment directions of the liquid crystal may be formed in one pixel.

As a means of forming the plurality of domains as such, there is a method of forming cutouts, such as slits and the like, in the field generating electrodes. Using the method, the liquid crystals are rearranged by a fringe field generated between edges of the cutouts and the field generating electrodes facing the edges thereof, thereby forming the plurality of domains.

In the case of a liquid crystal display including a plurality of domains, a portion of a pixel electrode may be formed to have a plate shape without slits or the like so as to increase transmittance. However, influence of a fringe field is reduced at a plate-shaped portion of the pixel electrode, and thus liquid crystal molecules are irregularly moved and response speeds of the liquid crystal molecules become slow, thereby deteriorating display quality.

The above information disclosed in this Background section is only for enhancement of an understanding of the background of the invention and therefore it may contain information that does not form the prior art that is already known in this country to a person of ordinary skill in the art.

SUMMARY OF THE INVENTION

The present invention has been developed in an effort to provide a liquid crystal display, including a plurality of domains, having the advantages of being capable of preventing irregular movement and slow response speed of liquid crystal molecules while increasing transmittance of the liquid crystal display.

An exemplary embodiment of the present invention provides a liquid crystal display including: a first substrate; a first electrode formed on the first substrate; a second substrate configured to face the first substrate; and a second electrode formed on the second substrate; wherein the first electrode includes a first portion having a plate shape and a plurality of branch electrodes extended from the first portion, the second electrode includes a cross-shaped cutout including a horizontal stem and a vertical stem which cross each other at a center thereof, and a width of the first electrode and a distance between two adjacent ones of the branch electrodes is varied according to position.

Each of the first electrode and the second electrode may be divided into a plurality of subregions by the cross-shaped cutout of the second electrode, the branch electrodes may include a first branch electrode formed to be adjacent to an edge of the subregion, a second branch electrode formed at a first side thereof close to the first branch electrode, and a third branch electrode formed at a second side of the second branch electrode, and a first distance between the first branch electrode and the second branch electrode may be wider than a second distance between the second branch electrode and the third branch electrode.

A width of the first branch electrode may be narrower than a width of the second branch electrode, and the width of the second branch electrode may be narrower than a width of the third branch electrode.

A length of the first branch electrode may be greater than a length of the second branch electrode, and the length of the second branch electrode may be greater than a length of the third branch electrode.

The first portion of the first electrode may have a rhombus shape, and the branch electrodes may be disposed so as to extend in four directions.

A length of the first branch electrode may be greater than a length of the second branch electrode, and the length of the second branch electrode may be greater than a length of the third branch electrode.

According to the exemplary embodiment of the present invention, it is possible to provide a liquid crystal display including a plurality of domains, which is capable of preventing irregular movement and slow response speed of liquid crystal molecules while increasing transmittance of the liquid crystal display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
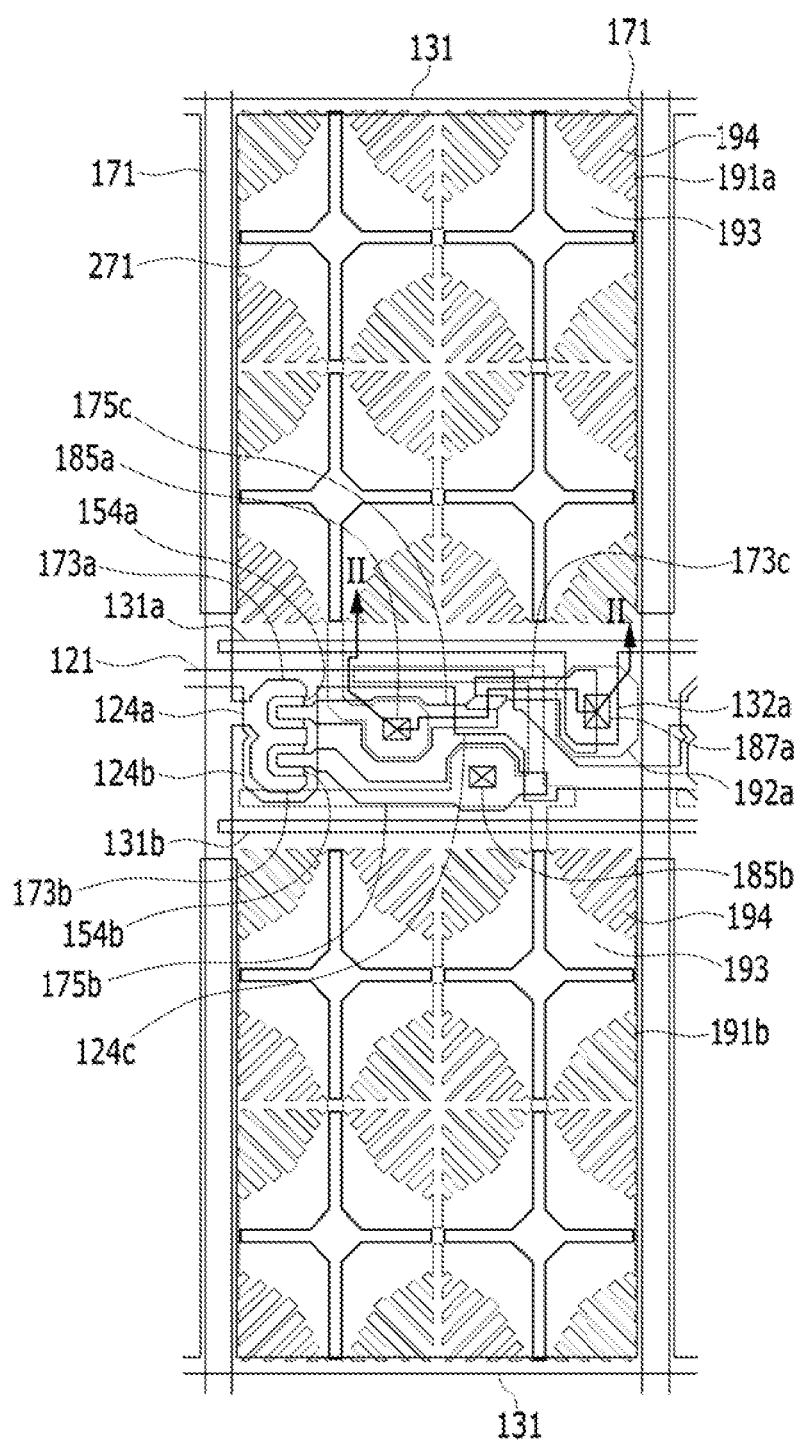
FIG. 1 is a layout view of a liquid crystal display according to an exemplary embodiment of the present invention.

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention.

In the drawings, the thickness of layers, films, panels, regions, etc. are exaggerated for clarity. Like reference numerals designate like elements throughout the specification. It will be understood that, when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display according to an exemplary embodiment of the present invention will be described with reference to FIG. 1 to FIG. 3. FIG. 1 is a layout view of a liquid crystal display according to an exemplary embodiment of the present invention, FIG. 2 is a cross-sectional view of the liquid crystal display taken along the line II-II in FIG. 1, and FIG. 3 is a top plan view illustrating a basic region of a field generating electrode of the liquid crystal display according to an exemplary embodiment of the present invention.

Figure 2:
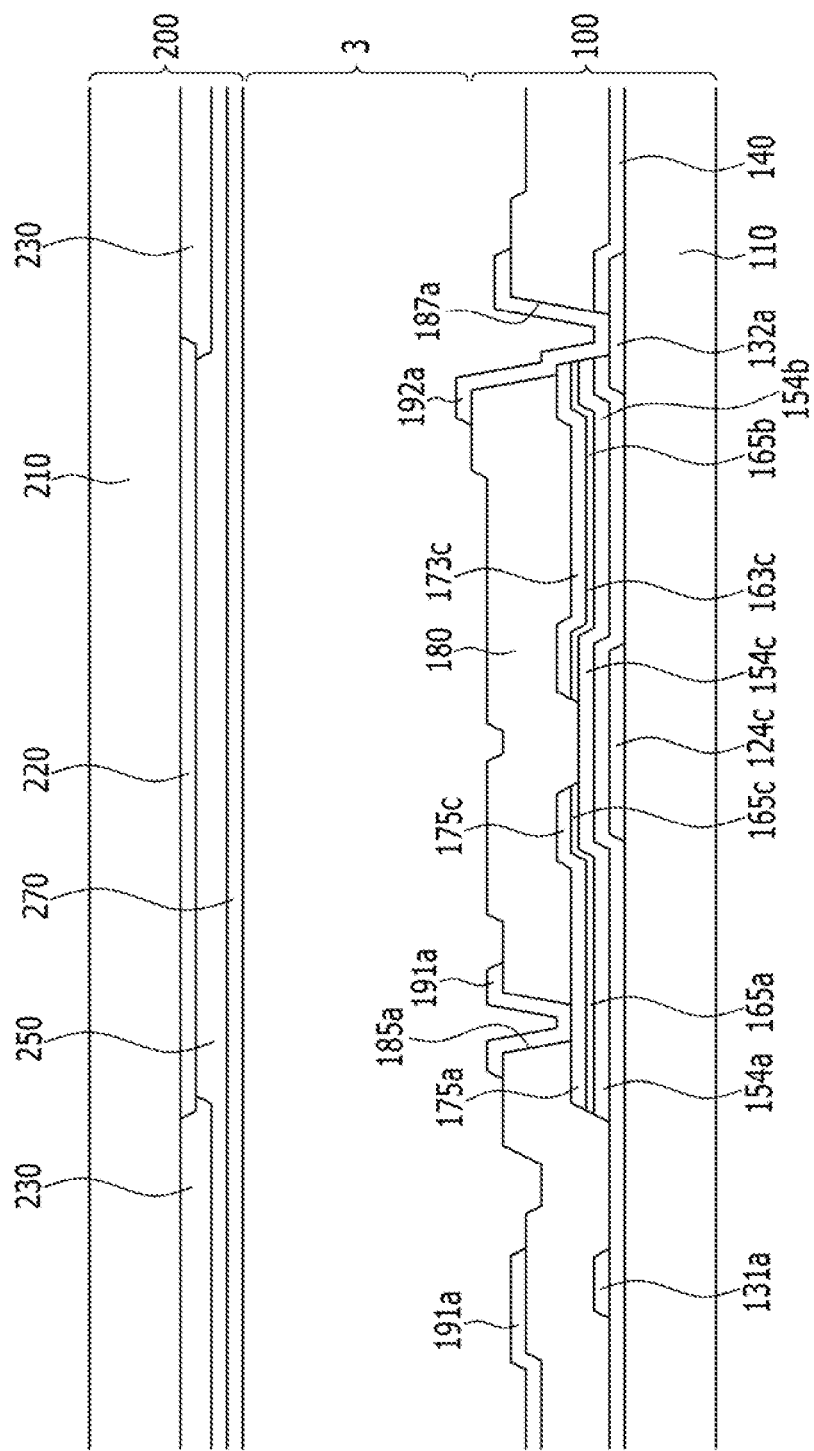
FIG. 2 is a cross-sectional view of the liquid crystal display taken along the line II-II in FIG. 1.
Figure 3:
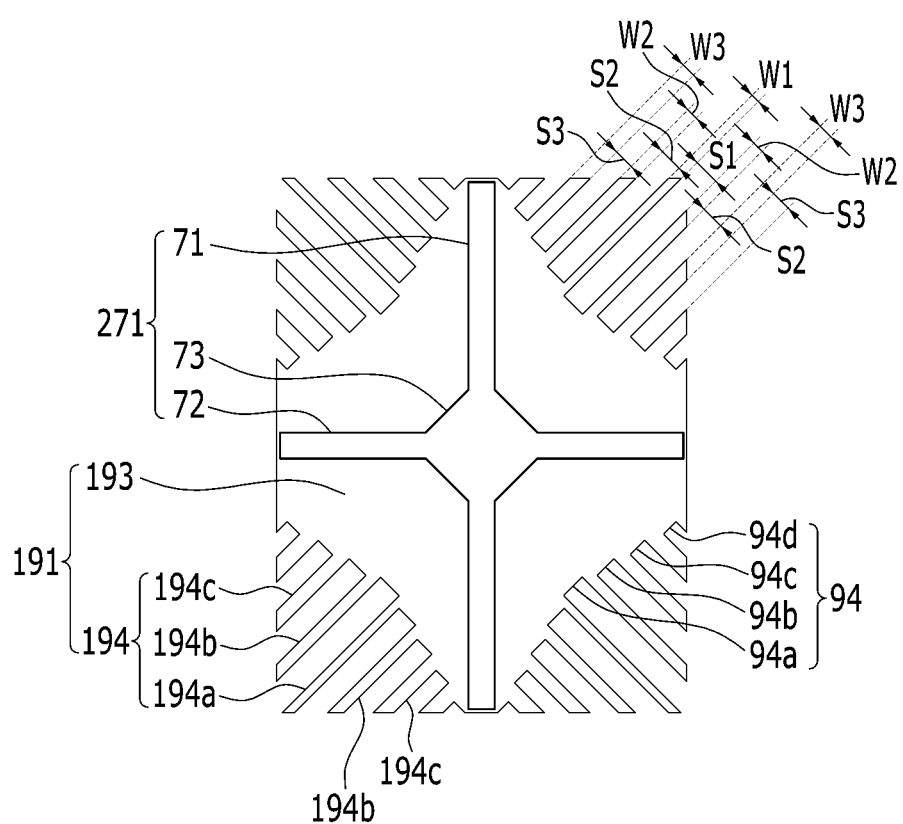
FIG. 3 is a top plan view illustrating a basic region of a field generating electrode of the liquid crystal display according to the exemplary embodiment of the present invention.

First, referring to FIG. 1 and FIG. 2, the liquid crystal display according to the present exemplary embodiment includes a lower display panel 100 and an upper display panel 200 disposed to face each other, and a liquid crystal layer 3 interposed between the two display panels 100 and 200.

Hereinafter, the lower display panel 100 will be described.

Gate conductors including a gate line 121, a storage electrode line 131, a first voltage transfer line 131a, and a second voltage transfer line 131b are formed on a first substrate 110.

The gate line 121 serves to transmit a gate signal, and includes a first gate electrode 124a, a second gate electrode 124b, and a third gate electrode 124c.

A gate insulating layer 140 is disposed on the gate line 121, first voltage transfer line 131a, and second voltage transfer line 131b.

A first semiconductor 154a, a second semiconductor 154b, and a third semiconductor 154c are disposed on the gate insulating layer 140.

Ohmic contacts 165a, 165b, and 165c are disposed on the first semiconductor 154a, the second semiconductor 154b, and the third semiconductor 154c. The semiconductors 154a, 154b, and 154c may include an oxide semiconductor, and in that case, the ohmic contacts may be omitted.

Data conductors include data lines 171 which include: a first source electrode 173a, a second source electrode 173b, and a third source electrode 173c; and a first drain electrode 175a, a second drain electrode 175b, and a third drain electrode 175c which are formed on the ohmic contacts 165a, 165b, and 165c, respectively, and a gate insulating layer 140. The first drain electrode 175a and the third drain electrode 175c are connected to each other.

A passivation layer 180 is formed on the data conductors 171, 173a, 173b, 173c, 175a, 175b, and 175c. The passivation layer 180 may be made of an inorganic insulator or an organic insulator.

A first contact hole 185a for partially exposing the first drain electrode 175a and a second contact hole 185b for partially exposing the second drain electrode 175b are formed in the passivation layer 180.

A third contact hole 187a is formed in the gate insulating layer 140 and the passivation layer 180 so as to expose a portion 132a of the first voltage transfer line 131a and the third source electrode 173a together.

A first subpixel electrode 191a, a second subpixel electrode 191b, and a first connecting member 192a are formed on the passivation layer 180.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b are separated from each other with the gate line 121 therebetween, and are disposed at the upper and lower sides of the pixel area based on the gate line 121 so as to be adjacent to each other in a column direction. Each of the first subpixel electrode 191a and the second subpixel electrode 191b includes a plate-shaped portion 193 having a rhombus shape, and a plurality of branch electrodes 194 extending in four different directions from the plate-shaped portion 193.

Each of the branch electrodes 194 includes a portion obliquely extended in the upper right direction, a portion obliquely extended in the lower right direction, a portion obliquely extended in the upper left direction, and a portion obliquely extended in the lower left direction. As such, the liquid crystal molecules of the liquid crystal layer 3 are inclined in different directions at portions at which the branch electrodes 194 are extended in different directions. Accordingly, four domains in which the liquid crystal molecules are inclined in different directions are formed at the liquid crystal layer 3. As such, when the liquid crystal molecules are inclined in various directions, a standard viewing angle of the LCD becomes wider.

A width of the branch electrodes 194 and a distance between two adjacent ones of the branch electrodes 194 are varied according to the positions of the branch electrodes 194.

This will be described later in detail with reference to FIG. 3.

The first connecting member 192a is formed on the third contact hole 187a so as to connect the portion 132a of the first voltage transfer line 131a to the third source electrode 173c.

The first gate electrode 124a, the first semiconductor 154a, the first source electrode 173a, and the first drain electrode 175a constitute a first switching element Qa; the second gate electrode 124b, the second semiconductor 154b, the second source electrode 173b, and the second drain electrode 175b constitute a second switching element Qb; and the third gate electrode 124c, the third semiconductor 154c, the third source electrode 173c, and the third drain electrode 175c constitute a third switching element Qc.

The second display panel 200 will now be described.

A light blocking member 220 is disposed on a second substrate 210. The light blocking member 220 is also called a black matrix and serves to prevent light leakage. A plurality of color filters 230 are disposed on the second substrate 210 and the light blocking member 220. An overcoat 250 is disposed on the color filters 230. The overcoat 250 serves to prevent the color filters 230 from being lifted and to suppress contamination of the liquid crystal layer 3 due to an organic material such as a solvent having flowed from the color filters 230, thereby preventing an abnormality such as a residual image which can occur when a screen is driven, and may be omitted. A common electrode 270 is disposed on the overcoat 250.

In the liquid crystal display according to the present exemplary embodiment, the light blocking member 220 and the color filters 230 are disposed in the upper display panel 200. However, the light blocking member 220 and the color filters 230 may be disposed in the lower display panel 100 in a liquid crystal display according to another exemplary embodiment of the present invention. In this case, the color filters 230 may be disposed instead of the passivation layer 180 of the first display panel 100.

The common electrode 270 has a cross-shaped first cutout 271 that is formed to correspond to each basic region of the first subpixel electrode 191a and the second subpixel electrode 191b. The first cutout 271 of the common electrode 270 may have a cross shape in a plan view.

When the liquid crystal display is viewed from above, each subregion of the first subpixel electrode 191a and the second subpixel electrode 191b is divided into four areas by the cross-shaped first cutout 271 of the common electrode 270 and the branch electrodes 194 of the pixel electrodes 191a and 191b.

The pixel electrodes 191a and 191b and the common electrode 270 include a plurality of basic regions which will be described later with reference to FIG. 3.

The liquid crystal layer 3 disposed between the two display panels 100 and 200 has a plurality of liquid crystal molecules having negative dielectric anisotropy. The liquid crystal molecules are arranged such that their long axes are perpendicular to the surfaces of the two display panels 100 and 200 in a state in which no electric field is generated at the liquid crystal layer 3.

The first subpixel electrode 191a and the common electrode 270 constitute the first liquid crystal capacitor Clca together with the liquid crystal layer 3 therebetween, and the second subpixel electrode 191b and the common electrode 270 constitute the second liquid crystal capacitor Clcb together with the liquid crystal layer 3 therebetween.

An electric field is applied to the liquid crystal layer 3 by voltages applied to the first subpixel electrode 191a and the second subpixel electrode 191b and a common voltage applied to the common electrode 270, and orientation of the liquid crystal molecules of the liquid crystal layer 3 is determined by the electric field intensity. As such, luminance of the light passing through the liquid crystal layer 3 is variable based on the orientation of the liquid crystal molecules.

Next, a basic region of a field generating electrode of the liquid crystal display according to the exemplary embodiment of the present invention will be described in more detail with reference to FIG. 3.

As shown in FIG. 3, the basic region of the field generating electrode of the liquid crystal display according to the present exemplary embodiment has a quadrangular shape.

The basic region includes the rhombus plate-shaped portion 193, the pixel electrode 191 including the branch electrodes 194 extending in four different directions from the plate-shaped portion 193, and the first cutout 271 of the common electrode 270 disposed to face the branch electrodes 194.

A central portion of the plate-shaped portion 193 of the pixel electrode 191 is overlapped with a central portion of the cross-shaped first cutout 271 formed in the common electrode 270.

The first cutout 271 of the common electrode 270 includes a vertical stem 71 and a horizontal stem 72. The first cutout 271 of the common electrode 270 further includes an extension 73 extended from a portion at which the vertical stem 71 and the horizontal stem 72 meet each other.

Each of the branch electrodes 194 of the pixel electrode 191 includes a portion obliquely extended in the upper right direction, a portion obliquely extended in the lower right direction, a portion obliquely extended in the upper left direction, and a portion obliquely extended in the lower left direction.

A width of the branch electrodes 194 of the pixel electrode 191 and a distance between adjacent ones of the branch electrodes 194 are varied according to the positions of the branch electrodes 194. The branch electrodes 194 of the pixel electrode 191 are defined by a plurality of second cutouts 91.

Each of the branch electrodes 194 of the pixel electrode 191 includes a first branch electrode 194a formed toward four edges of the basic region of the field generating electrode having a quadrangular shape, a second branch electrode 194b formed at opposite sides of the first branch electrode 194a, and a third branch electrode 194c formed at a side of the second branch electrode 194b. Accordingly, the first branch electrode 194a is formed to be adjacent to the four edges of the basic region of the field generating electrode of the first branch electrode 194a, and the third branch electrode 194c is formed to be adjacent to a horizontal center and a vertical center of the basic region of the field generating electrode.

A first width W1 of the first branch electrode 194a is narrowest among widths of the branch electrodes 194, and the widths of the branch electrodes 194 get wider as they approach the horizontal center and the vertical center of the basic region of the field generating electrode. Furthermore a first distance S1 between the first branch electrode 194a formed toward each of the four edges of the basic regions of the field generating electrode and one second branch electrode 194b adjacent thereto, which is generated by the second cutout 91 is widest among distances between two adjacent ones of the branch electrodes, and the distance between the two adjacent branch electrodes 194, i.e., the width of the second cutout 91 is reduced as it approaches to the horizontal center and the vertical center of the basic region of the field generating electrode.

A second width W2 of the second branch electrode 194b formed at opposite sides of the first branch electrode 194a is wider than the first width W1 of the first branch electrode 194a, and a third width W3 of the third branch electrode 194c formed at a side of the second branch electrode 194b is wider than the second width W2 of the second branch electrode 194b. Furthermore the first distance Si between the first branch electrode 194*a* and second branch electrode 194*b* formed at opposite sides of the first branch electrode 194*a* is wider than the second distance S2 between the second branch electrode 194*b* and the third branch electrode 194*c* adjacent thereto.

In addition, a length of the first branch electrode 194*a* is longer than that of the second branch electrode 194*b,* and the length of the second branch electrode 194*b* is longer than that of the third branch electrode 194*c.* As a result, the length of the first branch electrode 194*a* among the branch electrodes 194 is longest.

As described above, each of the basic regions of the field generating electrodes is divided into four subregions by the branch electrodes 194 of the pixel electrode 191 and the cross-shaped first cutout 271 of the common electrode.

The first branch electrode 194*a* is disposed so as to extend to a central portion of each subregion of the basic regions of the field generating electrodes, and the first branch electrode 194 among the branch electrodes 194 is most distant from a central portion of the cross-shaped first cutout 271 of the common electrode 270. Furthermore the length of the first branch electrode 194*a* among the branch electrodes 194 is longest.

Ends 94 of the second cutouts 91 by which the branch electrodes 194 of the pixel electrode 191 are not positioned in the same line. Specifically, a first end 94*a* of the second cutout 91 formed at the side of the first branch electrode 194*a* disposed to correspond to each of the four edges of the basic regions of the field generating electrodes is extended toward the central portion of the basic region of the corresponding field generating electrode, thereby being closest to the central portion of the basic region, and a second end 94*a,* a third end 94*b,* a fourth end 94*c,* and a fifth end 95*e* are sequentially formed from the first end 94*a* to an edge of the basic region of the field generating electrode so as to be gradually distant from the central portion of the basic region.

Among the branch electrodes 194 formed at each subregion of the basic region of the field generating electrode, the first branch electrode 194*a* formed so as to extend to the central portion of each subregion has the longest length and the narrowest width. Among the widths of the second cutouts 91 formed at opposite sides of the first branch electrode 194*a,* i.e., distances between two adjacent branch electrodes 194, the first distance 51 between the first branch electrode 194*a* and the second branch electrode 194*b* formed at opposite sides of the first branch electrode 194*a* is the widest. Furthermore the widths of the branch electrodes 194 get wider as they approach the central portion of the basic region of the field generating electrode, i.e., the cross-shaped first cutout 271 of the common electrode 20, and the distance between the two adjacent branch electrodes 194 gets narrower as it approaches the cross-shaped first cutout 271 of the common electrode 20.

The magnitude of a fringe field generated around the branch electrodes 194 is proportional to the widths of the second cutouts 91 by which the branch electrodes 194 are defined, i.e., the distances between the two adjacent ones of the branch electrodes 194. As a result, the magnitude of the fringe field is increased as the widths of the second cutouts 91 get wider.

Accordingly, the magnitude of the fringe field generated by the branch electrodes 194 generated at each subregion of the basic regions of the field generating electrodes is largest around the first branch electrode 194*a* disposed to extend to the central portion of each subregion of the basic regions of the field generating electrode, and thus, the magnitude of the fringe field that is applied to the liquid crystal molecules positioned to correspond to the plate-shaped portion 193 of the pixel electrode 191 disposed the central portion of each subregion thereof is larger than the fringe field generated by the branch electrode disposed at the edge of each subregion of the basic regions of the field generating electrodes.

As a result, it becomes easy to control an azimuthal angle, which is a direction in which the director of the liquid crystal molecules is inclined, that is, the direction of the director of the liquid crystal molecules at a central portion of a domain of the pixel area.

As such, by adjusting the widths of the branch electrodes 194 of the pixel electrode 191 and the distances between the two adjacent ones of the branch electrodes 194, i.e., the widths of the second cutouts 91 of the pixel electrode 191, the azimuthal angle, which is a direction in which the director of the liquid crystal molecules positioned at a central portion of a domain of the pixel area is inclined, that is, the direction of the director of the liquid crystal molecules, can be additionally controlled, thereby preventing irregular movement of the liquid crystal molecules positioned at the central portion thereof.

Herein, the azimuthal angle indicates an angle at which the director of the liquid crystal molecules projected onto a substrate surface is inclined with respect to the signal line, e.g., the gate line or the data line.

In accordance with the liquid crystal display according to the exemplary embodiment of the present invention, it is possible to improve transmittance of the liquid crystal display by forming the plate-shaped portion 193 of the pixel electrodes of the basic regions of the field generating electrodes. Furthermore by adjusting the widths of the branch electrodes 194 of the pixel electrode 191 and the distances between the two adjacent ones of the branch electrodes 194, i.e., the widths of the second cutouts 91 of the pixel electrode 191, the azimuthal angle, which is a direction in which the director of the liquid crystal molecules positioned at a central portion of a domain of the pixel area is inclined, that is, the direction of the director of the liquid crystal molecules, can be additionally controlled, thereby preventing irregular movement of the liquid crystal molecules positioned at the central portion thereof and preventing the response speed from being reduced.

Figure 4:
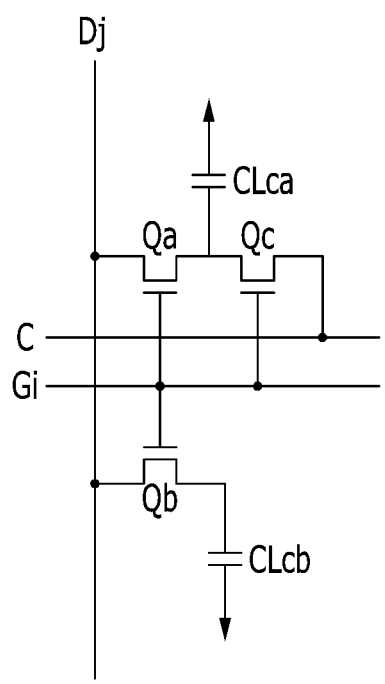
FIG. 4 is a circuit diagram of a liquid crystal display according to an exemplary embodiment of the present invention.

Hereinafter, a driving method of a liquid crystal display according to an exemplary embodiment of the present invention will be described with reference to FIG. 4. FIG. 4 is a circuit diagram of a liquid crystal display according to an exemplary embodiment of the present invention.

Referring to FIG. 4, the liquid crystal display according to the present exemplary embodiment includes a plurality of signal lines Gi, Dj, and C, a first switching element Qa, a second switching element Qc, and a third switching element Qc, connected thereto, and a first liquid crystal capacitor Clca and a second liquid crystal capacitor Clcb.

The signal lines Gi, Dj, and C include a gate line Gi for transferring a gate signal (also referred to as "scanning signal"), a data line Dj for transferring a data voltage, and a reference voltage line C for transferring a predetermined reference voltage.

A reference voltage having a constant magnitude is applied to the reference voltage line C, and a polarity of the reference voltage is varied per frame. For example, when the common voltage has a magnitude of 7.5 V, the reference voltage has a magnitude of about 15 V or about 0 V per frame. The reference voltage may be greater or smaller than the maximum value of the data voltage. Furthermore a difference between the reference voltage and the common voltage when the reference voltage has positive polarity based on the common voltage is different from a difference between the reference voltage and the common voltage when the reference voltage has negative polarity based on the common voltage.

The first switching element Qa and the second switching element Qb are each connected to the gate line Gi and the first data line Dj, and the third switching element Qc is connected to the gate line Gi, the reference voltage line C, and an output terminal of the first switching element Qa.

The first switching element Qa and the second switching element Qb are three-terminal elements such as thin film transistors, and include a control terminal connected to the gate line Gi and an input terminal connected to the first data line Dj. Furthermore an output terminal of the first switching element Qa is connected to the first liquid crystal capacitor Clca and an output terminal of the third switching element Qc, and an output terminal of the second switching element Qb is connected to the second liquid crystal capacitor Clcb.

The third switching element Qc is also a three-terminal element such as a thin film transistor, and includes a control terminal connected to the gate line Gi, an input terminal connected to the first reference voltage line C, and an output terminal connected to the first liquid crystal capacitor Clca.

A gate-on signal is applied to the gate line Gi, thereby turning on a first switching element Qa, a second switching element Qb, and a third switching element Qc connected to the gate line Gj. Accordingly, The data voltage applied to the first data line Dj is respectively applied to the first liquid crystal capacitor Clca and a terminal of the second liquid crystal capacitor Clcb through the first switching element Qa and the second switching element Qb, respectively, which are turned on.

In this case, the first liquid crystal capacitor Clca and the second liquid crystal capacitor Clcb are charged with a same voltage, and one terminal of the first liquid crystal capacitor Clca is connected to the output terminal of the third switching element Qc, and thus is boosted by the reference voltage which is applied to the reference voltage line C through the third switching element Qc. In this case, the reference voltage applied to the reference voltage line C may have the same polarity as that of the data voltage applied to the data line Dj, and may have a magnitude that is greater than that of the data voltage applied to the data line Dj. As a result, a voltage of the reference voltage line C to which a relatively high voltage is applied through the third switching element Qc is divided, and thus the voltage charged in the first liquid crystal capacitor Clca has a level that is higher than that of the data voltage applied through the data line Dj.

Accordingly, the voltage charged in the first liquid crystal capacitor Clca is different from the voltage charged in the second liquid crystal capacitor Clcb, and thus an angle at which liquid crystal molecules are inclined in a first subpixel is different from an angle at which liquid crystal molecules are inclined in a second subpixel, thereby allowing the luminance of two subpixels to be different from each other. Therefore, by appropriately adjusting the voltage of the first liquid crystal capacitor Clca and the voltage of the second liquid crystal capacitor Clcb, an image viewed from the side can be controlled so as to approach an image viewed from the front as closely as possible, thereby improving side visibility.

Figure 5:
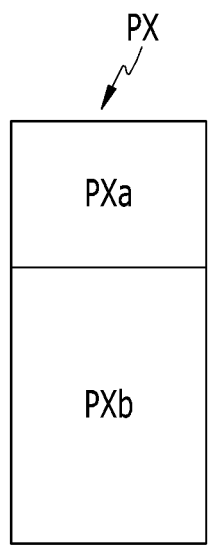
FIG. 5 illustrates two subpixels included in one pixel of a liquid crystal display according to an exemplary embodiment of the present invention.
Figure 7:
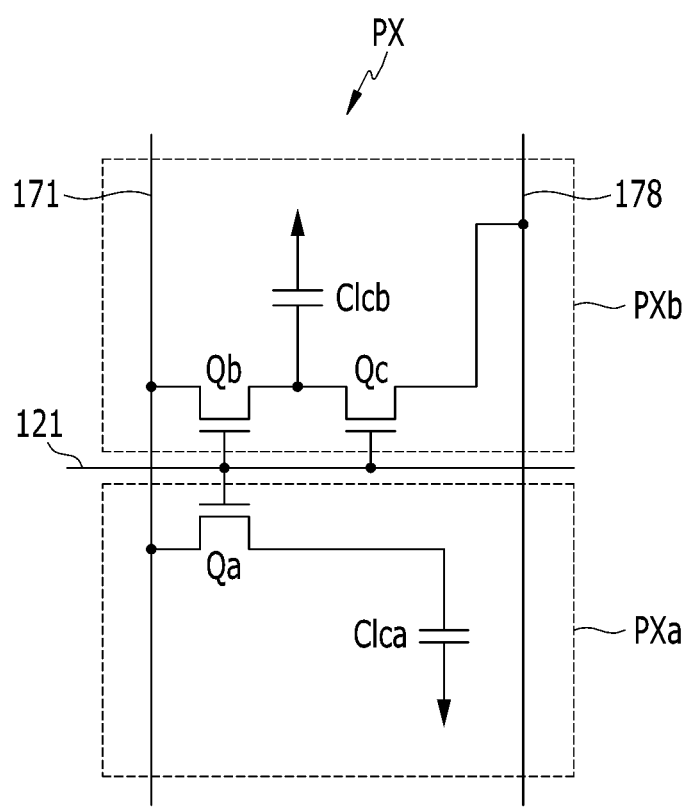
FIG. 7 is an equivalent circuit diagram of one pixel of a liquid crystal display according to an exemplary embodiment of the present invention.
Figure 8:
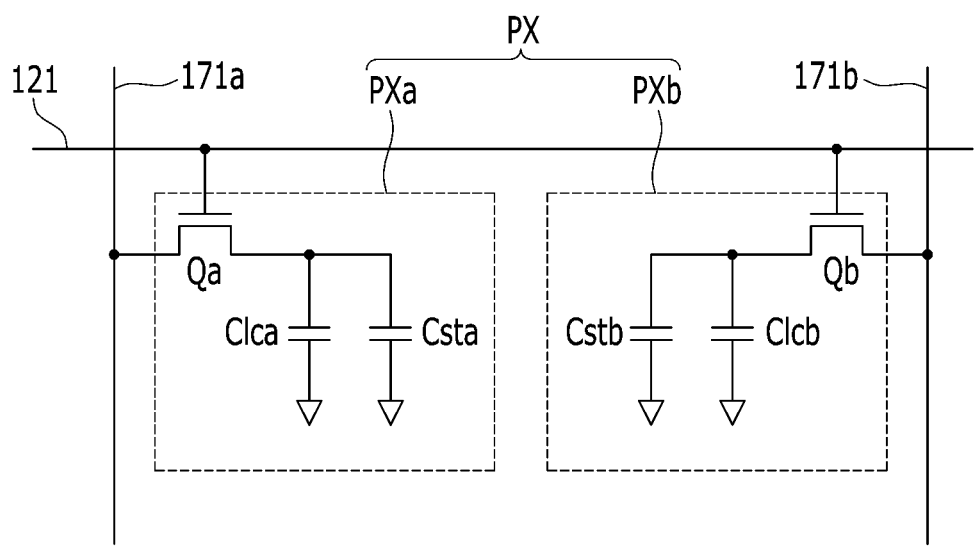
FIG. 8 to FIG. 10 are equivalent circuit diagrams of one pixel of a liquid crystal display according to an exemplary embodiment of the present invention.
Figure 9:
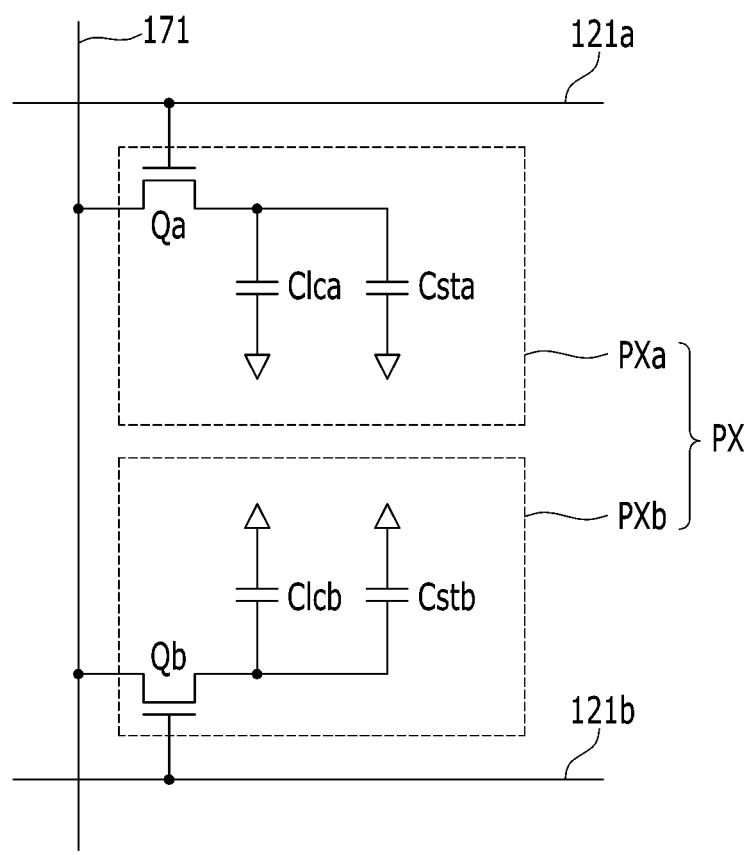
Figure 10:
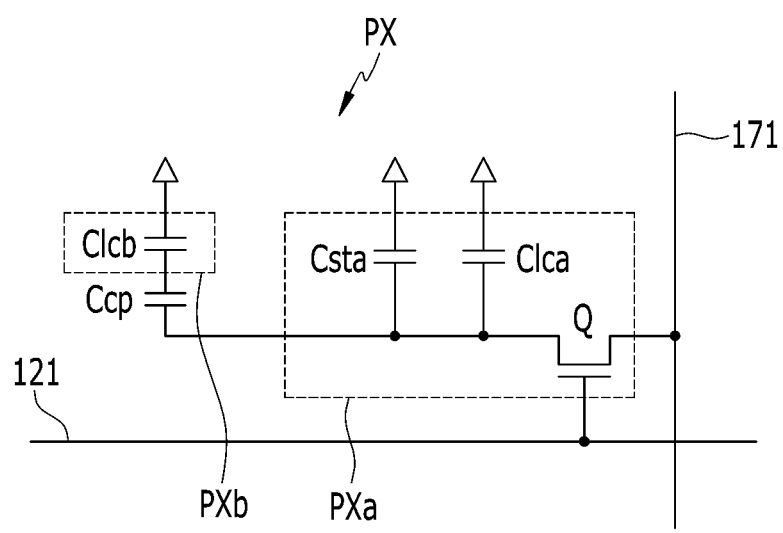

Hereinafter, liquid crystal displays according to other exemplary embodiments of the present invention will be described with reference to FIG. 5 to FIG. 10. FIG. 5 illustrates two subpixels included in one pixel of a liquid crystal display according to an exemplary embodiment of the present invention, FIG. 6 is an equivalent circuit diagram of one pixel of a liquid crystal display according to an exemplary embodiment of the present invention, FIG. 7 is an equivalent circuit diagram of one pixel of a liquid crystal display according to an exemplary embodiment of the present invention, and FIG. 8 to FIG. 10 are equivalent circuit diagrams of one pixel of a liquid crystal display according to an exemplary embodiment of the present invention.

Referring to FIG. 5, one pixel PX of a liquid crystal display according to an exemplary embodiment of the present invention may include a first subpixel PXa and a second subpixel PXb. The first subpixel PXa and the second subpixel PXb may display images according to different gamma curves, and display images according to the same gamma curve for one input image signal. In other words, the first subpixel PXa and the second subpixel PXb of one pixel PX may display images having different luminance to improve side visibility for one input image signal. Areas of the first subpixel PXa and the second subpixel PXb may be the same as or different from each other.

Figure 6:
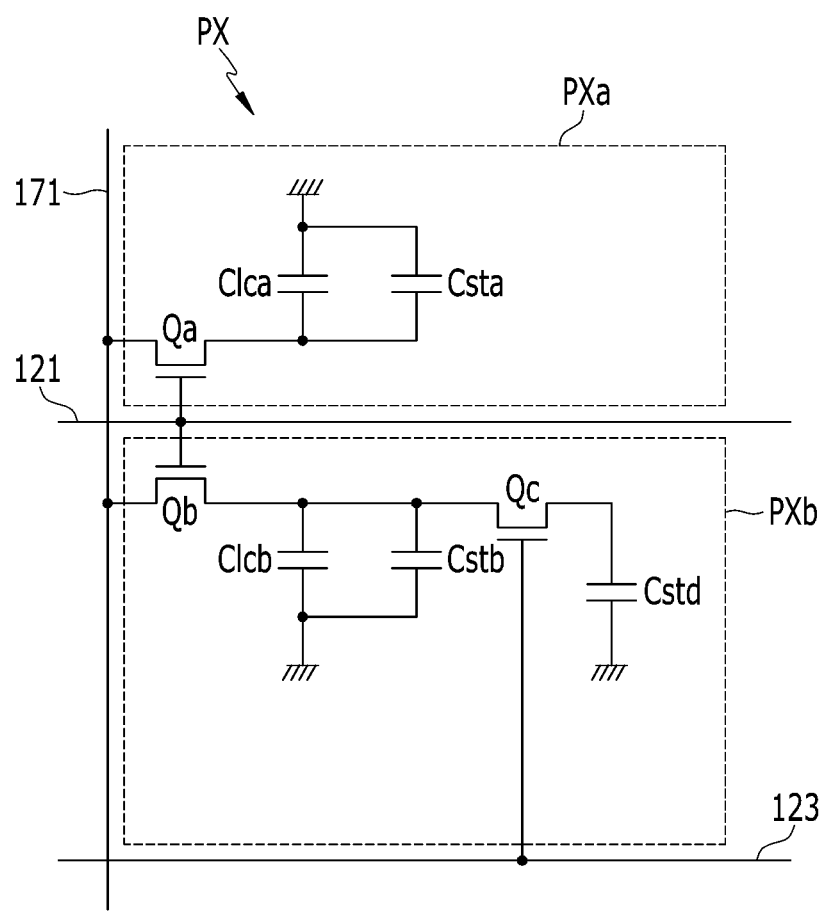
FIG. 6 is an equivalent circuit diagram of one pixel of a liquid crystal display according to an exemplary embodiment of the present invention.

As such, the pixel PX, including the first subpixel PXa and the second subpixel PXb, may have various circuit structures and dispositions to display the images having different luminance FIG. 6 is an equivalent circuit diagram of one pixel of a liquid crystal display according to an exemplary embodiment of the present invention.

Referring to FIG. 6, the liquid crystal display according to the exemplary embodiment of the present invention includes signal lines including a gate line 121, a step-down gate line 123, and a data line 171, and a pixel PX connected to the signal lines.

Each pixel includes first and second subpixels PXa and PXb, respectively.

The first subpixel PXa includes a first switching element Qa, a first liquid crystal capacitor Clca, and a first storage capacitor Csta, and the second subpixel PXb includes second and third switching elements Qb and Qc, respectively, a second liquid crystal capacitor Clcb, a second storage capacitor Cstb, and a step-down capacitor Cstd.

The first and second switching elements Qa and Qb, respectively, are connected to the gate line 121 and the data line 171, and the third switching element Qc is connected to the step-down gate line 123.

The switching elements Qa and Qb are three-terminal elements such as thin film transistors, and control terminals thereof are connected to the gate lines 121, input terminals thereof are connected to the data lines 171, and output terminals thereof are respectively connected to the first and second liquid crystal capacitors Clca and Clcb respectively, and the first and second storage capacitors Csta and Cstb, respectively.

The third switching element Qc is also a three-terminal element such as a thin film transistor, and a control terminal thereof is connected to the step-down gate line 123, an input terminal thereof is connected to the second liquid crystal capacitor Clcb and the second storage capacitor Cstb, and an output terminal thereof is connected to the step-down capacitor Cstd.

The step-down capacitor Cstd is connected to the output terminal of the third switching element Qc and a common voltage.

Operation of the pixel PX will now be described. When a gate-on voltage Von is firstly applied to the gate line 121, the first and second switching elements Qa and Qb, respectively, connected thereto are turned on. Accordingly, the data voltage of the data line 171 is applied to the first and second liquid crystal capacitors Clca and Clcb, respectively, through the turned-on first and second switching elements Qa and Qb, respectively, and thus the first and second liquid crystal capacitors Clca and Clcb, respectively, are charged with a voltage corresponding to a difference between the data voltage Vd and the common voltage Vcom. In this case, a gate-off voltage Voff is applied to the step-down gate line 123.

Next, when the gate-off voltage Voff is applied to the gate line 121 and the gate-on voltage Von is applied to the step-down gate line 123, the first and second switching elements Qa and Qb, respectively, are turned off, and the third switching element Qc is turned on. As a result, a charging voltage of the second liquid crystal capacitor Clcb connected to the output terminal of the second thin film transistor Qb is reduced. Accordingly, in the case of the liquid crystal display driven by frame inversion, the charging voltage of the second liquid crystal capacitor Clcb may always be lower than a charging voltage of the first liquid crystal capacitor Clca. Accordingly, it is possible to improve side visibility of the liquid crystal display by differentiating the charge voltages of the first and second liquid crystal capacitors Clca and Clcb, respectively.

FIG. 7 is an equivalent circuit diagram of one pixel of a liquid crystal display according to an exemplary embodiment of the present invention.

Referring to FIG. 7, the liquid crystal display according to an exemplary embodiment of the present invention includes signal lines including the gate line 121, the data line 171, a reference voltage line 178 transferring a reference voltage, and the like, and the pixel PX connected thereto.

Each pixel includes first and second subpixels PXa and PXb, respectively. The first subpixel PXa includes the first switching element Qa and the first liquid crystal capacitor Clca, and the second subpixel PXb includes the second and third switching elements Qb and Qc, respectively, and the first and second liquid crystal capacitors Clca and Clcb, respectively.

The first and second switching elements Qa and Qb, respectively, are each connected to the gate line 121 and the data line 171, and the third switching element Qc is connected to the output terminal of the second switching element Qb and to the reference voltage line 178.

The output terminal of the first switching element Qa is connected to the first liquid crystal capacitor Clca, and the output terminal of the second switching element Qb is connected to the second input liquid crystal capacitor Clcb and to the input terminal of the third switching element Qc. The control terminal of the third switching element Qc is connected to the gate line 121, the input terminal thereof is connected to the second liquid crystal capacitor Clcb and to the output terminal of the second switching element Qb, and the output terminal thereof is connected to the reference voltage line 178.

Operation of the pixel PX shown in FIG. 7 will now be described. When a gate-on voltage Von is firstly applied to the gate line 121, the first, second and third switching elements Qa, Qb and Qc, respectively, connected thereto are turned on. Accordingly, the data voltage applied to the data line 171 is applied to the first liquid crystal capacitor Clca and to the second liquid crystal capacitor Clcb, respectively, through the first switching element Qa and the second switching element Qb respectively, which are turned on, and thus the first liquid crystal capacitor Clca and the second liquid crystal capacitor Clcb are charged to as much as a difference between the data voltage and the common voltage Vcom. In this case, the same data voltage is transferred to the first liquid crystal capacitor Clca and the second liquid crystal capacitor Clcb through the first and second switching elements Qa and Qb, respectively, but the charging voltage of the second liquid crystal capacitor Clcb is divided through the third switching element Qc. As a result, the charging voltage of the second liquid crystal capacitor Clcb is smaller than that of the first liquid crystal capacitor Clca, and thus the luminance of the two subpixels PXa and Pxb may be different. Accordingly, by appropriately adjusting the voltage of the first liquid crystal capacitor Clca and the voltage of the second liquid crystal capacitor Clcb, an image viewed from the side can be controlled so as to approach an image viewed from the front as closely as possible, thereby improving side visibility.

FIG. 8, FIG. 9, and FIG. 10 are respectively equivalent circuit diagrams of one pixel of a liquid crystal display according to exemplary embodiments of the present invention, illustrating various circuit structures of one pixel PX including the first subpixel PXa and the second subpixel PXb.

Referring to FIG. 8, the liquid crystal display according to an exemplary embodiment of the present invention includes signal lines including first and second data lines 171*a* and 171*b*, respectively, and the gate line 121, and the pixel PX connected thereto.

Each pixel includes first and second subpixels PXa and PXb, respectively. The first subpixel PXa includes a first switching element Qa, a first liquid crystal capacitor Clca, and a first storage capacitor Csta, and the second subpixel PXb includes a second switching element Qb, a second liquid crystal capacitor Clcb, and a second storage capacitor Cstb.

The first switching element Qa includes a control terminal connected to the gate line 121 and an input terminal connected to the first data line 171*a*. An output terminal of the first switching element Qa is connected to the first liquid crystal capacitor Clca and to the first storage capacitor Csta.

The second switching element Qb includes a control terminal connected to the gate line 121 and an input terminal connected to the second data line 171*b*. An output terminal of the second switching element Qb is connected to the second liquid crystal capacitor Clcb and to the second storage capacitor Cstb.

The first liquid crystal capacitor Clca and the second liquid crystal capacitor Clcb may receive different data voltages Vd for one input image signal IDAT through the first and second switching elements Qa and Qb, respectively, which are connected to different data lines 171*a* and 171*b*, respectively.

Next, referring to FIG. 9, the display device according to the exemplary embodiment includes signal lines including a data line 171 and first and second gate lines 121*a* and 121*b*, respectively, and the pixel PX connected thereto. Each pixel includes first and second subpixels PXa and PXb, respectively.

The first switching element Qa included in the first subpixel PXa includes a control terminal connected to the first gate line 121*a* and an input terminal connected to the data line 171. An output terminal of the first switching element Qa is connected to the first liquid crystal capacitor Clca and to the first storage capacitor Csta.

The second switching element Qb includes a control terminal connected to the second gate line 121*b* and an input terminal connected to the data line 171. An output terminal of the second switching element Qb is connected to the second liquid crystal capacitor Clcb and to the second storage capacitor Cstb.

The first liquid crystal capacitor Clca and the second liquid crystal capacitor Clcb may receive different data voltages Vd for one input image signal IDAT through the first and second switching elements Qa and Qb, respectively, which are connected to different gate lines 121a and 121b, respectively.

Next, referring to FIG. 10, the display device according to the exemplary embodiment includes signal lines including a data line 171 and a gate line 121, and the pixel PX connected thereto. Each pixel PX may include first and second subpixels Pxa and PXb, respectively, and a coupling capacitor Ccp which is connected between the two subpixels PXa and PXb.

The first subpixel Pxa includes a switching element Q connected to the gate line 121 and the data line 171, and a first liquid crystal capacitor Clca and a first storage capacitor Csta which are connected thereto, while the second subpixel PXb includes a second liquid crystal capacitor Clcb connected with the coupling capacitor Ccp.

A control terminal of the switching element Q is connected to the gate line 121, an input terminal thereof is connected to the data line 171, and an output terminal thereof is connected to the first liquid crystal capacitor Clca, the first storage capacitor Csta, and the coupling capacitor Ccp. The switching element Q may transfer a data voltage Vd of the data line 171 to the first liquid crystal capacitor Clca and the coupling capacitor Ccp according to a gate signal from the gate line 121, and the coupling capacitor Ccp may transfer the data voltage Vd, a magnitude of which is changed, to the second liquid crystal capacitor Clcb. A charged voltage Vb of the second liquid crystal capacitor Clcb may always be smaller than a charged voltage Va of the first liquid crystal capacitor Clca because of the coupling capacitor Ccp. As a result, by appropriately controlling the capacitance of the coupling capacitor Ccp, a ratio of the charging voltage Va of the first liquid crystal capacitor Clca and the charging voltage Vb of the second liquid crystal capacitor Clcb is controlled, thereby improving the lateral visibility.

In the liquid crystal display according to the several exemplary embodiments, the first subpixel electrode and the second subpixel electrode constituting one terminal of each of the first liquid crystal capacitor Clca and the second liquid crystal capacitor Clcb included in the pixel PX may have the same shape and function as the lower electrode 191 according to the previous several exemplary embodiments, and the common electrode 270 of each of the subpixels PXa and PXb may also have the same shape and function as the common electrode 270 according to the previous several exemplary embodiments.

As such, in accordance with the liquid crystal display according to the exemplary embodiment of the present invention, it is possible to improve transmittance of the liquid crystal display by forming the plate-shaped portion 193 of the pixel electrodes of the basic regions of the field generating electrodes. Furthermore, by adjusting the widths of the branch electrodes 194 of the pixel electrode 191 and the distances between the two adjacent ones of the branch electrodes 194, i.e., the widths of the second cutouts 91 of the pixel electrode 191, the azimuthal angle, which is a direction in which the director of the liquid crystal molecules positioned at a central portion of a domain of the pixel area is inclined, that is, the direction of the director of the liquid crystal molecules, can be additionally controlled, thereby preventing irregular movement of the liquid crystal molecules positioned at the central portion thereof and preventing the response speed of the liquid crystal molecules from being reduced. Accordingly, it is possible to prevent irregular movement of the liquid crystal molecules positioned at the central portion of a domain of the pixel area, and also to prevent the response speed from being reduced, thereby preventing display quality deterioration.

While this invention has been described in connection with what is presently considered to be practical exemplary embodiments, it is to be understood that the invention is not limited to the disclosed embodiments but, on the contrary, is intended to cover various modifications and equivalent arrangements included within the spirit and scope of the appended claims.

What is claimed is:

1. A liquid crystal display, comprising:
a first substrate;
a first electrode formed on the first substrate;
a second substrate facing the first substrate; and
a second electrode formed on the second substrate,
wherein the first electrode includes a first portion having a plate shape and a plurality of branch electrodes extending from the first portion;
wherein the second electrode includes a cross-shaped cutout including a horizontal stem and a vertical stem which cross each other at a center thereof; and
wherein a width of each branch electrode of the first electrode and a distance between two adjacent ones of the branch electrodes are varied according to a position.

2. The liquid crystal display of claim 1, wherein each of the first electrode and the second electrode is divided into a plurality of subregions by the cross-shaped cutout of the second electrode;
wherein the branch electrode includes a first branch electrode formed so as to be adjacent to an edge of the subregion, a second branch electrode formed at a first side thereof close to the first branch electrode, and a third branch electrode formed at a second side of the second branch electrode; and
wherein a first distance between the first branch electrode and the second branch electrode is wider than a second distance between the second branch electrode and the third branch electrode.

3. The liquid crystal display of claim 2, wherein a width of the first branch electrode is narrower than a width of the second branch electrode; and
wherein the width of the second branch electrode is narrower than a width of the third branch electrode.

4. The liquid crystal display of claim 3, wherein a length of the first branch electrode is longer than a length of the second branch electrode; and
wherein the length of the second branch electrode is longer than a length of the third branch electrode.

5. The liquid crystal display of claim 4, wherein the first portion of the first electrode has a rhombus shape; and
wherein the branch electrodes are disposed so as to extend in four directions.

6. The liquid crystal display of claim 2, wherein a length of the first branch electrode is longer than a length of the second branch electrode; and
wherein the length of the second branch electrode is longer than a length of the third branch electrode.

7. The liquid crystal display of claim 6, wherein the first portion of the first electrode has a rhombus shape; and
wherein the branch electrodes are disposed so as to extend in four directions.

8. The liquid crystal display of claim 1, wherein each of the first electrode and the second electrode is divided into a plurality of subregions by the cross-shaped cutout of the second electrode;

wherein the branch electrode includes a first branch electrode formed so as to be adjacent to an edge of the subregion, a second branch electrode formed at a first side thereof close to the first branch electrode, and a third branch electrode formed at a second side of the second branch electrode;

wherein a width of the first branch electrode is narrower than a width of the second branch electrode; and wherein the width of the second branch electrode is narrower than a width of the third branch electrode.

9. The liquid crystal display of claim 8, wherein a length of the first branch electrode is longer than a length of the second branch electrode, and wherein the length of the second branch electrode is longer than a length of the third branch electrode.

10. The liquid crystal display of claim 9, wherein the first portion of the first electrode has a rhombus shape; and wherein the branch electrodes are disposed to extend in four directions.

\* \* \* \* \*